W. R. McMILLAN.
DENTAL FLOSS HOLDER.
APPLICATION FILED JULY 24, 1911.
1,053,523.
Patented Feb. 18, 1913.
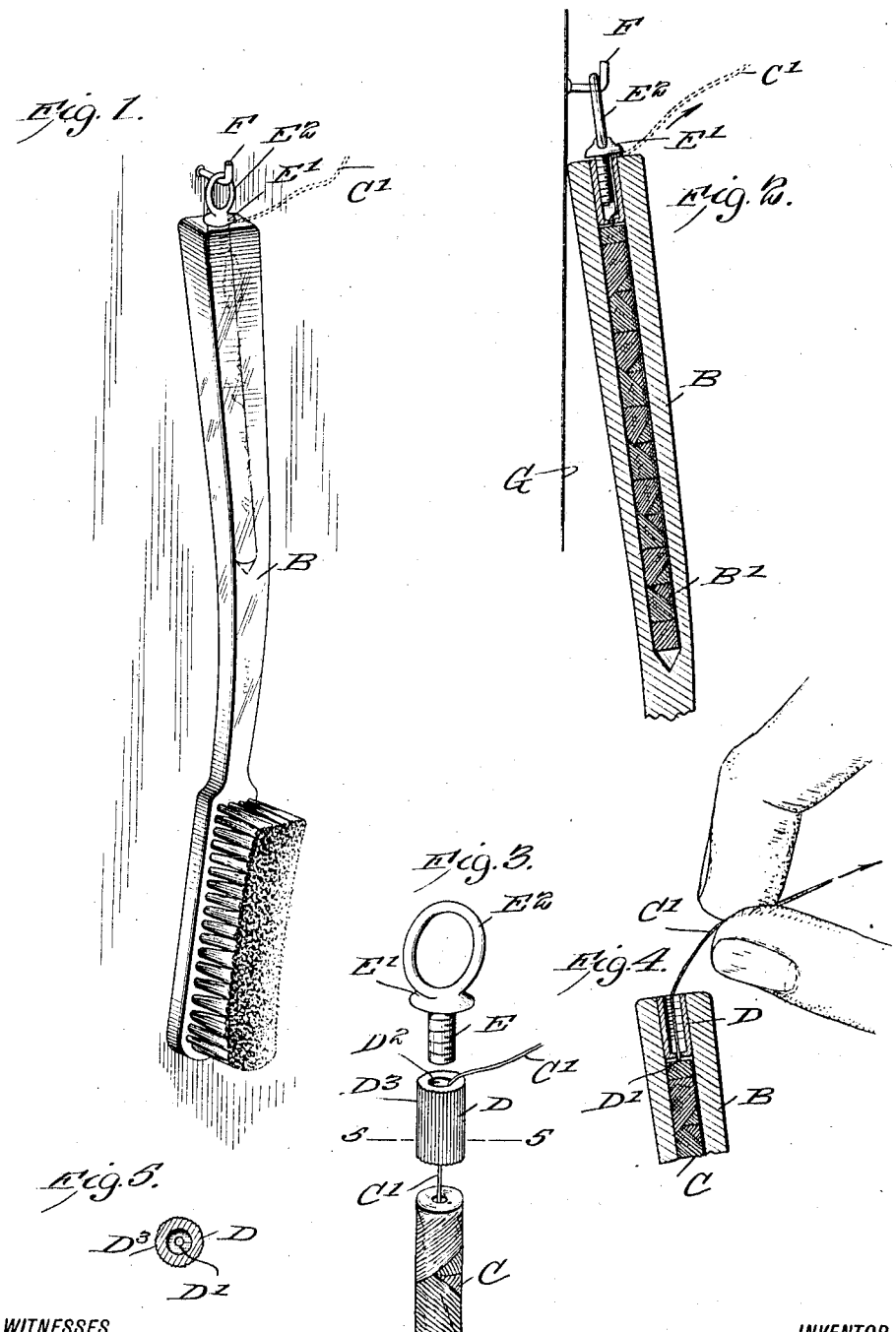
WITNESSES
E. M. Callaghan
Perry B. Turpin
INVENTOR
WALTER R. McMILLAN
BY Munn & Co.
ATTORNEYS

UNITED STATES PATENT OFFICE.

WALTER REILY McMILLAN, OF FLATBUSH, NEW YORK.

DENTAL FLOSS-HOLDER.

1,053,523.  Specification of Letters Patent.  Patented Feb. 18, 1913.

Application filed July 24, 1911. Serial No. 640,318.

*To all whom it may concern:*

Be it known that I, WALTER REILY Mc-MILLAN, a citizen of the United States, and a resident of Flatbush, Long Island, in the county of Kings and State of New York, have invented certain new and useful Improvements in Dental Floss-Holders, of which the following is a specification.

This invention is an improvement in dental floss holders.

It has for its object to combine a floss holder and a friction and cutting device in one instrumentality.

The improvement is of such a nature that it may be readily employed in connection with a tooth brush, and I have so shown and described it herein, but I do not limit the employment of my invention to its application to a tooth brush handle, although the convenience of having the floss holder as part of the tooth brush will be readily appreciated. In addition, tooth brushes are generally made of bone or celluloid and are readily adaptable as a holder for the dental floss and are generally of sanitary material.

The invention resides in the specific construction and combination of parts hereinafter described and claimed.

In the drawing Figure 1 is a perspective view of the brush suspended from a hook. Fig. 2 is a sectional view, partly broken away, of the brush handle suspended from a hook. Fig. 3 is a detail perspective view showing the spool of floss, the socket piece and the plug separated. Fig. 4 is a sectional view of the upper portion of the handle with the socket piece in place and the plug removed and illustrating the operation of withdrawing a portion of the floss. Fig. 5 is a detail cross section of the socket piece on about line 5—5 of Fig. 1, looking down and in at the bottom of the socket piece.

The brush or bristle part A may be of any ordinary construction or material as may the handle B, except in the detail construction of the latter, as more fully described hereinafter. As shown, the handle B is socketed longitudinally from its butt end at B' for a sufficient length to receive a spool C of dental floss, the spool being of a form which permits the withdrawal of the floss from the center of the spool which I claim as original. The spool of dental floss is seated in the socket B', as best shown in Figs. 2 and 4, and in the open end of the socket is fitted the socket piece D which is provided at its inner end with a cross or bottom plate having an opening D' through which the floss may be drawn into the socket $D^2$ of the piece D, the said socket $D^2$ being threaded to receive the threaded plug E which has a broad flange E' to abut the outer end of the socket piece and a ring $E^2$ which serves as a handle for the plug and also as a means for suspending the brush from any suitable support, such for instance as a hook F as shown.

The brush when of the form shown, will, if suspended from the hook F, be held away from the wall G or other support and the flange E', when the plug is screwed home, rests tightly against the outer end of the socket piece D and upon the strand C' of floss from the spool C, so that a sharp pull upwardly upon the floss will break the same off immediately adjacent to the flange E' where the latter bears against the outer end of the socket piece.

The socket piece D is formed to fit in the outer end of the hole B' in handle B, and in order that it may bind securely in the cavity, it is preferably milled on its outer surface as indicated at $D^3$.

By the invention, it will be noticed I provide the handle with a cavity or hole for the dental floss spool with a closure in the open end of said cavity consisting of the socket piece D and the threaded plug for closing the socket piece, which device cannot be used for paste, powder or liquids as in other patents. Manifestly by the use of the described construction, the plug may be unscrewed and the floss drawn out to the desired length, the handle affording a suitable portion to be grasped by one hand which may also hold the floss immediately adjacent to the handle while the free end of the floss is held in the other hand, so the floss can be conveniently manipulated between the teeth as is desired. The provision of the floss in connection with the brush handle is important as thereby the brush and floss are all in one and the plug feature is important as it secures a sanitary closure for the floss bobbin and also a convenient means for facilitating the breaking off of the floss which has been used.

I thus provide by the described construction for facilitating the cleansing of the teeth by having both the floss and the brush together, thus avoiding the necessity of looking for the floss when needed, which should be just before using the brush, as well as just afterward, and the metallic fixtures in the form of the socket piece and the plug are important for the reasons described, the plug making the handle cavity air and water tight, thus preserving the unused stock of floss from dampness.

It will be also understood that the operation of the threaded plug in the socket acts to bind the floss between them, clamping the thread between the plug and the socket and restraining its inadvertent movement and aiding in a measure in cutting the thread or weakening it adjacent to the bearing of the flange upon the outer end of the socket piece, so the floss can be conveniently broken off at the bearing between the flange of the plug and the end of the socket piece, doing away with a separate cutter as in other patent floss holders.

Manifestly the handle may be of metal, celluloid, hard rubber, bone, wood or other suitable substance, preferably transparent celluloid, inasmuch as thereby the contents of the socket will be exposed to view and when exhausted will remind the user of the necessity of renewing the floss. The screw plug and the flange for facilitating the severing of the floss which has been used, coöperate as the screw plug upon being unscrewed, always brings out to the surface enough of the floss end to be readily grasped by the fingers and pulled out to the required length for use before reinserting the screw plug.

The floss employed is specially turned out in ten and twelve yard spools designed to draw from a center thread and enabling the free use of all the floss until the end has been reached when a new supply can be readily inserted, a hook or other suitable instrument being employed to pull the entire metal combination out of the handle after which a new bobbin may be inserted and the socket piece and handle reapplied, the outer end of the floss being threaded through the socket piece as shown in Fig. 4.

I claim:—

1. A dental floss holder comprising a handle having a bore adapted to receive a spool of floss, a hollow socket frictionally secured in said bore, the socket having an opening in its base adapted to permit the floss thread to pass therethrough and an internal thread at its outer end, and a plug having a threaded stem engaging the thread of the socket and a lateral flange adapted to bear upon the outer end of the socket, whereby the thread may be passed through the hollow in the end of the socket held in place by the said threads and flange and be severed by the said flange.

2. The combination, substantially as described, of a handle, having a cavity formed from its end and adapted to receive a bobbin of floss, a bobbin in the said cavity, a socket piece in the outer end of the cavity and having its outer side milled lengthwise whereby to bind within the cavity and yet capable of forcible longitudinal withdrawal, the bore of the socket piece being threaded and provided at the inner end of said bore with an opening through which the floss is threaded, the floss extending outwardly through the socket piece and over the end thereof and a plug screwed in the socket and provided with a flange adapted to bind the thread of floss against the outer end of the socket piece, substantially as set forth.

3. A dental floss holder comprising a handle having a cavity formed in its end and adapted to receive a bobbin of floss, a socket piece in the outer end of the cavity and having at its inner end a bottom or cross plate provided with an opening through which the floss may be drawn, the socket piece being bored and provided at its outer end with a threaded seat, and a plug screwed in the threaded seat of the socket and provided with a flange adapted to bind the thread of floss against the outer end of the socket piece, substantially as set forth.

4. A dental floss holder comprising a handle having a cavity in its outer end, a socket piece fitted in the said cavity and having a longitudinal passage through which a thread of floss may be drawn, and a plug screwing in the outer end of said socket piece and having a flange to bind upon the socket piece, whereby to act as a cutter for the floss and also having a ring by which the device may be suspended when not in use, substantially as described.

WALTER REILY McMILLAN.

Witnesses:
NELLIE PETERS,
ARCHIBALD H. W. MACMILLAN.